United States Patent [19]

Logan et al.

[11] Patent Number: 4,711,035

[45] Date of Patent: Dec. 8, 1987

[54] METHOD AND APPARATUS FOR MAKING A PATTERN FOR A LENS OPENING IN AN EYEGLASS FRAME

[75] Inventors: David J. Logan, Glastonbury; Kenneth O. Wood, Ellington; William Hernandez, Madison; Richard L. Edwards, Windsor Locks, all of Conn.

[73] Assignee: Gerber Scientific Products, Inc., Manchester, Conn.

[21] Appl. No.: 896,615

[22] Filed: Dec. 8, 1987

[51] Int. Cl.⁴ .............................................. G02C 7/02
[52] U.S. Cl. ...................................... 33/200; 33/507; 33/562; 408/3; 409/80
[58] Field of Search ................. 33/507, 200, 505, 504, 33/503, 562; 364/413; 408/3; 409/67, 68, 79, 80

[56] References Cited

U.S. PATENT DOCUMENTS

| | | | |
|---|---|---|---|
| 2,582,048 | 1/1952 | Line | 33/200 X |
| 3,730,634 | 5/1973 | Gerber et al. | 408/3 X |
| 3,783,741 | 1/1974 | Schadebrodt et al. | 409/80 |
| 4,328,726 | 5/1982 | Pearl | 408/3 |
| 4,512,380 | 4/1985 | Schmidt | 409/80 X |
| 4,573,121 | 2/1986 | Saigo et al. | 33/507 X |

Primary Examiner—William D. Martin, Jr.
Attorney, Agent, or Firm—McCormick, Paulding & Huber

[57] ABSTRACT

A method and apparatus for making a pattern from a blank in accordance with a set of coordinates defining a plurality of data points and collectively characterizing the size and shape of a lens opening in an eyeglass frame is presented. A controller includes an instruction set to control the operation of a router coupled to a carriage arranged for rectilinear movement toward and away from a work station and relative to the rotation of a blank fixtured at the work station whereby a pattern is cut with the desired size and shape. The apparatus further includes a sensor and light source in the feeding and staging area of the apparatus to advance a blank to a fixturing spindle located at the work station and to determine the nasal side orientation of the blank at the work station.

16 Claims, 9 Drawing Figures

METHOD AND APPARATUS FOR MAKING A PATTERN FOR A LENS OPENING IN AN EYEGLASS FRAME

BACKGROUND OF THE INVENTION

The present invention relates generally to a method and associated apparatus for making a pattern for a lens opening in an eyeglass frame and deals more specifically with a pattern making method and apparatus for cutting a pattern from a blank in accordance with a set of coordinates defining a plurality of data points and collectively characterizing the size and shape of a lens opening.

The optical industry generally produces a pattern having the size and shape of a lens opening in an eyeglass frame for use as a guide in an edge grinding and contouring apparatus to peripherally edge grind an optical lens to the size and shape of the lens opening. The pattern is normally made by manually aligning a frame lens opening with a blank and fixturing the frame and the blank together to transfer the shape of the lens opening to the blank. Generally, the shape of the lens opening is transferred to a grid-like marking on the surface of the blank by tracing the outline of the inner periphery of the lens opening with some type of marker or other transfer device. The blank is then cut following the outline on the blank surface to form a pattern corresponding to the associated traced lens opening.

In order to produce an accurate optical lens from an associated pattern, it is critical that the alignment of the A axis and the mechanical center of the lens opening in the frame be properly aligned with the A axis and the mechanical center of the blank and accordingly, the mechanical center and A axis of a pattern cut from the blank. A scissors may be used to cut a blank made from a material such as plastic and the edges of the pattern smoothed by filing or grinding. Oftentimes a trial and error procedure is followed to remove inconsistences from the pattern to provide a better fit with a given frame.

Consequently, presently known methods and associated apparatus used to generate a pattern for a lens opening in an eyeglass frame are labor intensive, require a great deal of skill to carry out and are generally unsatisfactory to provide large quantities of patterns accurately and quickly.

It would be desirable therefore to have a method and apparatus for the production of patterns that are quickly and accurately cut from blanks and that overcome the drawbacks generally associated with other known methods and apparatus of pattern production.

An object of the present invention is therefore to provide a method and associated apparatus for the high volume production of accurately shaped and sized patterns for lens openings in eyeglass frames.

Another object of the invention is to provide apparatus that automatically and quickly fixtures a blank at a work station for cutting into a desired pattern.

A further object of the present invention is to provide a method and apparatus for automatically feeding blanks from a supply of blanks wherein the supply of blanks is in the form of a chain.

It is yet a further object of the present invention to provide a method and apparatus for cutting a pattern from a blank using coordinate information characterizing the size and shape of a lens opening in an eyeglass frame.

SUMMARY OF THE INVENTION

The present invention resides in a method and associated apparatus for making patterns for lens openings in eyeglass frames. The invention specifically resides in a pattern generator that includes a work station at which blanks to be cut into patterns are automatically fed and fixtured onto a spindle. A set of coordinates defining a plurality of data points collectively characterize the size and shape of an associated lens opening in an eyeglass frame are provided to a controller from an external data source such as, a data base computer or a frame tracer. A cutter is responsive to the controller and moves along a rectilinear path toward and away from the blank fixtured on the spindle in accordance with commands from the controller as the spindle and a fixtured blank rotate relative to the movement of the cutter thereby cutting the blank into a desired pattern having the size and shape corresponding to the lens opening defined by the associated set of coordinates.

The invention further resides in the generator having a feeding and staging area including means for advancing blanks automatically along a path and a sensor for determining the nasal side of a blank so that a resultant pattern cut from the blank has a side identified with and corresponding to the nasal side of a lens opening thus permitting the pattern to be used with conventional lens edge grinding and contouring apparatus.

BRIEF DESCRIPTION OF THE DRAWINGS

Other objects, features and advantages of the invention will be readily apparent from the following written description and the accompanying drawings wherein.

DETAILED DESCRIPTION OF THE PREFERRED EMBODIMENTS

Figure 1:
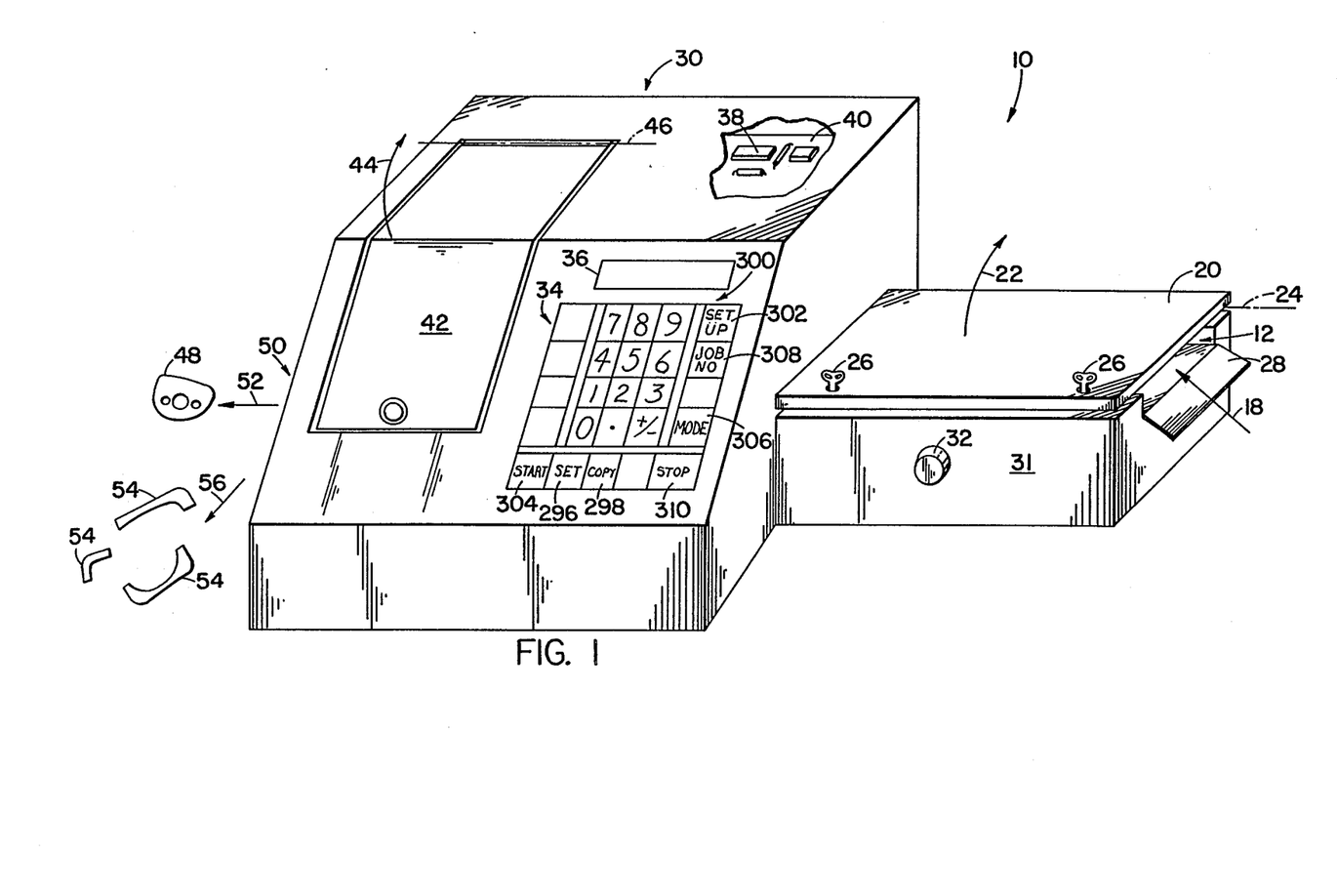
FIG. 1 is a perspective somewhat schematic view of a production pattern generator embodying the present invention.
Figure 6:
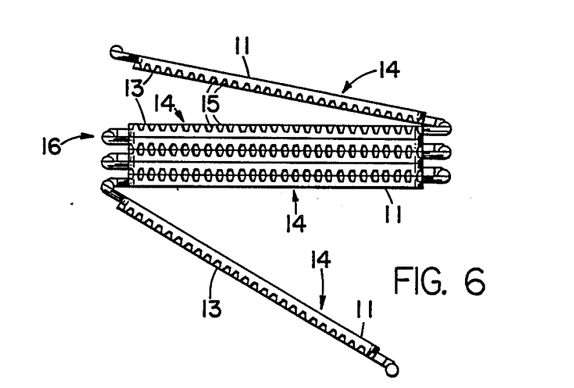
FIG. 6 is a slightly exploded side view of a number of blanks in a chain particularly suitable for automatic feeding of the pattern generator.
Figure 7:
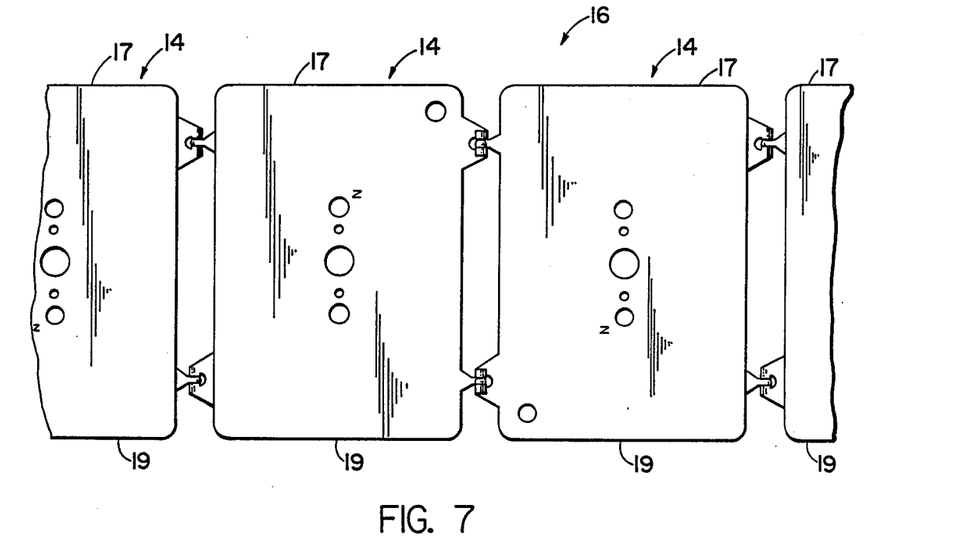
FIG. 7 is a slightly exploded top view of a number of blanks unfolded for feeding the pattern generator.

Turning now to the drawings and considering FIGS. 1, 6 and 7 in particular, a perspective somewhat schematic view of a production pattern generator embodying the present invention is shown in FIG. 1 and designated generally 10. The generator 10 includes a blank feeding and staging area designated generally 12 through which a blank travels in a direction shown by arrow 18 along a path in the generator. The blanks may be fed singly on a one-at-a-time basis but preferably are fed as a chain 16 which chain is illustrated in FIGS. 6 and 7. FIG. 6 illustrates a number of blanks 14,14 in a like face-to-like face arrangement to form a compactly folded package. FIG. 7 shows a number of blanks 14,14 extended end-to-end as they might be fed along the feeding and staging area 12. Each blank 14 comprises a rectangularly shaped, relatively thin body having an upper surface 11 and a lower surface 13 and arranged to be connected together in a hinged, like edge-to-like edge fashion. The lower surface 13 of each blank 14 includes drive elements or teeth 15,15 and comprises a rack gear along each margin 17,19 of the blank. A blank suitable for use with the pattern generator of the present invention is disclosed in a copending application entitled "BLANK FOR USE IN A LENS PATTERN GENERATOR" Ser. No. 06/896,840 filed concurrently herewith and assigned to the same assignee as the present application. Reference may be had to the above referenced application for further details of the blank.

The blank feeding and staging area 12 includes a hinged lid 20 illustrated in FIG. 1 in a closed position. The lid 20 opens in a direction indicated by arrow 22 and pivots about a longitudinal hinge axis 24 when fasteners 26,26 are operated to release the lid. The blank feeding and staging area 12 also includes an apron 28 for guiding blanks 14,14 into the area 12 to facilitate movement of the blanks along the path in the feeding area and to a work station located along the path and within a section 30 of the generator. A knob 32 extends from an outside front wall 31 of the blank feeding and staging area 12 and is coupled to drive gears having teeth to engage the teeth 15,15 along the margins 17,19 of a blank. Turning the knob 32 causes the drive gears to rotate to facilitate the loading of a first blank 14 in a chain 16 of blanks in the generator.

The generator 10 also includes a keypad 34 for selecting the various functions of the pattern generator as described below and for inputting information into the generator. A display 36 is used as an operator prompt by displaying messages and instructions and to display other information and data. A microprocessor or controller 38 is contained on a circuit board 40 along with other electrical components comprising the electronic circuitry necessary to control the operation of the pattern generator 10. The controller 38 is programmed with an instruction set to carry out the cutting and other operations of the pattern generator 10.

Still referring to FIG. 1, the pattern generator 10 includes a hinged access panel 42 that opens in the direction of arrow 44 about a hinged axis 46 to permit access to components in the region of the work station. In a preferred embodiment, the hinged access panel 42 is of a transparent plastic material to permit viewing of the pattern cutting operation.

A pattern 48 that has been cut by the pattern generator 10 at the work station is discharged from one side 50 of the generator in the direction of arrow 52 onto a discharge chute (not illustrated in FIG. 1) to permit removal by an operator. The scrap parts 54,54 that occur as a result of cutting a pattern 48 from a blank 14 are discharged from the generator 10 in the direction of arrow 56 into a suitable container for collecting such scrap.

Figure 2A:
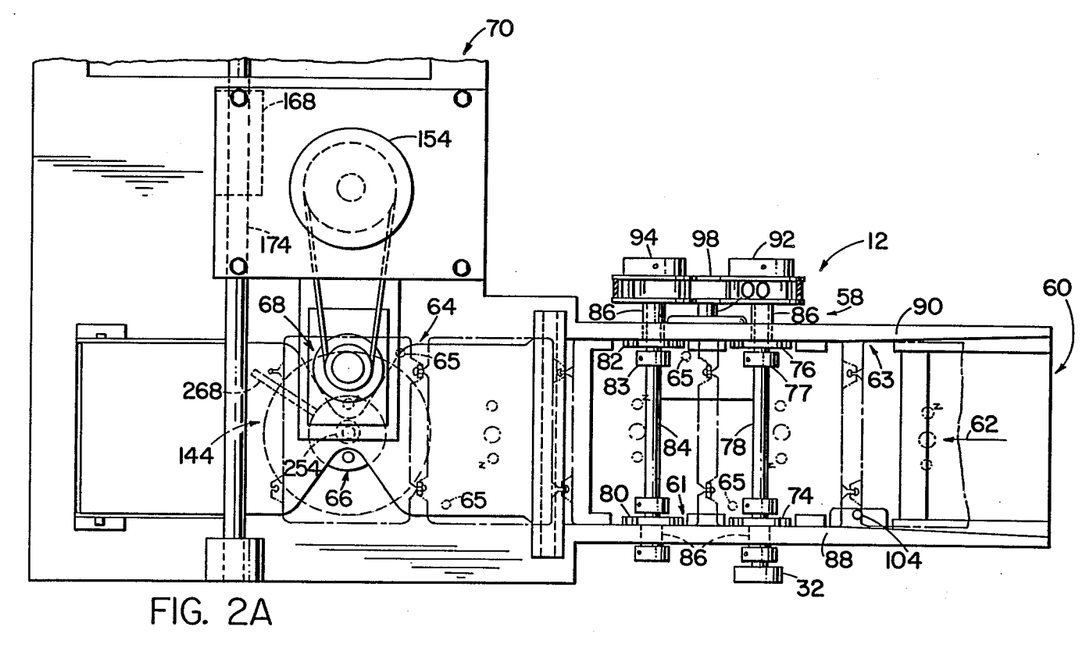
FIG. 2A and FIG. 2B are top plan views of a somewhat schematic representation of the production pattern generator of FIG. 1 with the cover removed.
Figure 2B:
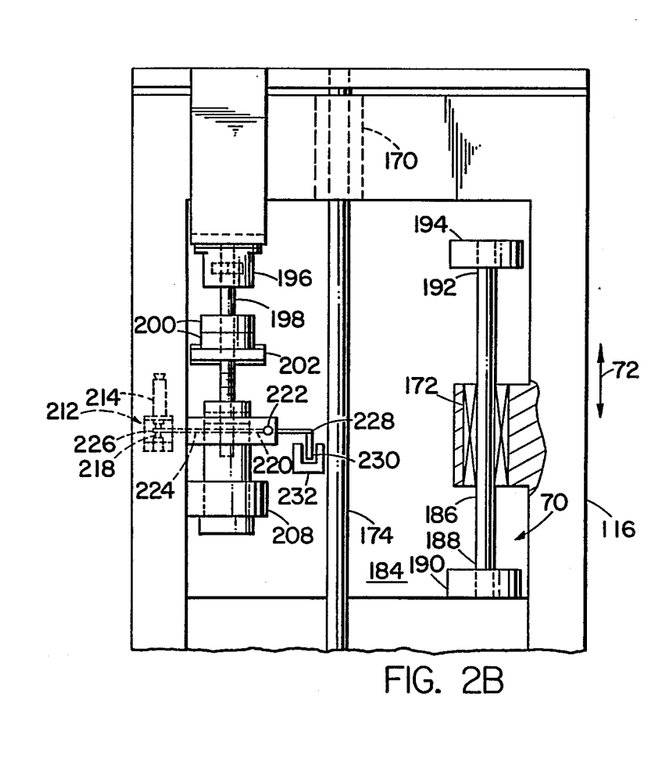
Figure 3:
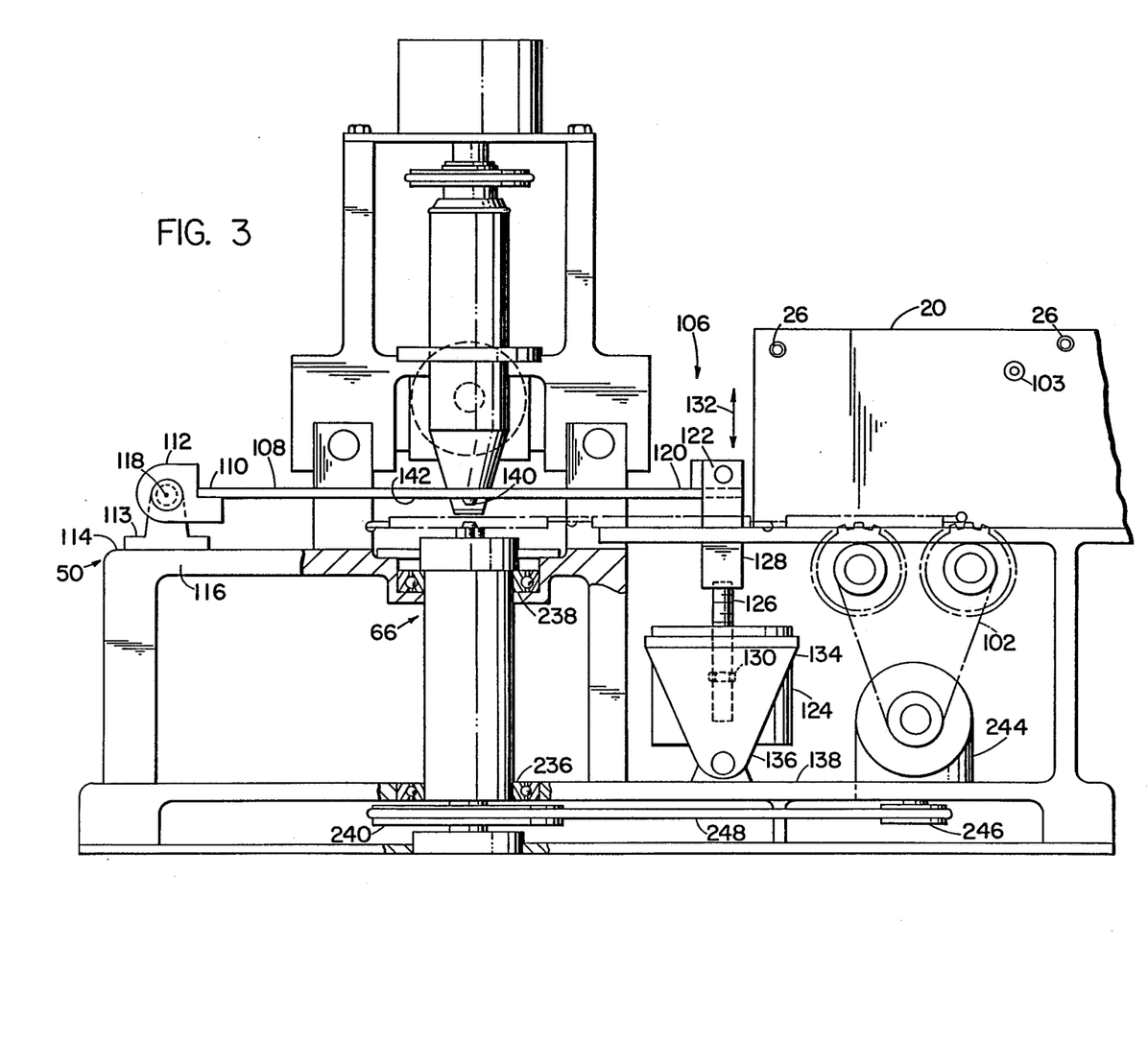
FIG. 3 is a front elevational view of the pattern generator shown in FIG. 2A and FIG. 2B
Figure 4:
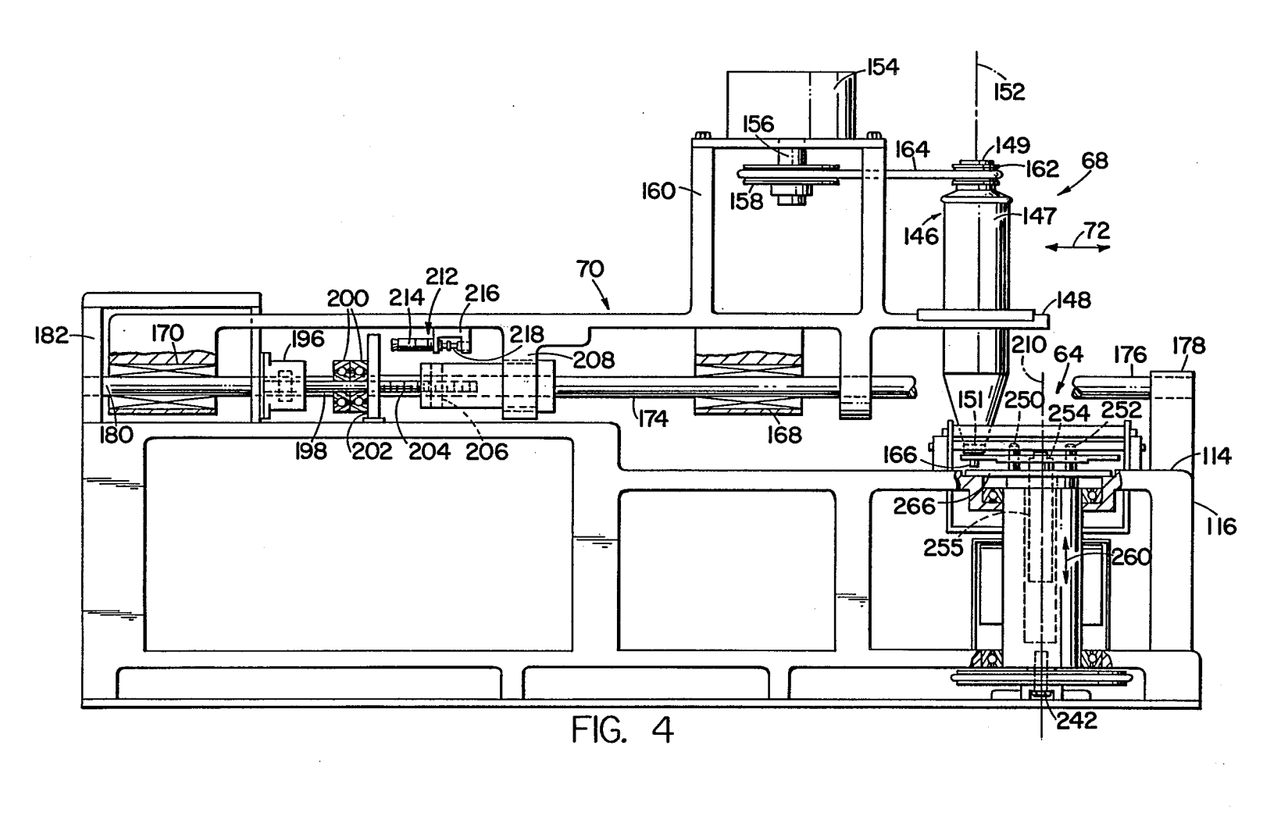
FIG. 4 is a side elevational view of the pattern generator as shown in FIGS. 2A, 2B and 3.

Turning now to FIGS. 2-4, the pattern generator 10 of FIG. 1 is shown with the cover removed to reveal the various subassemblies comprising the pattern generator. The generator includes a drive mechanism designated generally 58 for moving blanks from an entry generally designated 60 along a path 62 to a work station generally indicated 64. The work station 64 includes a fixturing mechanism designated generally 66 for holding a blank fed to the work station. A cutting mechanism 68 is mounted to a carriage assembly 70 for movement with the carriage toward and away from the work station 64 in a direction indicated by arrow 72 and generally transverse to the travel path 62 along which a blank moves into the work station 64 and out of the work station after a pattern is cut from the blank.

Considering the various subassemblies in greater detail, the drive mechanism 58 comprises a set of drive gears 74,76 coupled to a shaft 78 for rotation with the shaft and located opposite one another with one gear 74 along one margin 61 of the path 62 and the other gear 76 located along the other margin 63 of the path 62. A second set of drive gears 80,82 are coupled to a shaft 84 for rotation with the shaft and are located opposite one another with gear 80 being located along one margin 61 of the path 62 and gear 82 being located along the other margin 63 of the path. The shafts 78,84 are substantially parallel to one another and at a predetermined spaced apart distance. The shafts 78,84 rotate in bushings or bearings 86,86 which bearings are journalled in the side rails 88,90 respectively. The side rails 88,90 are in a spaced relation to one another and define the path 62. A drive gear 92 is coupled to one end 77 of the shaft 78 and a drive gear 94 is coupled to one end 83 of shaft 84 and at the same side and in alignment with the drive gear 92. A step motor 96 includes a drive gear 98 coupled to an output shaft 100 of the motor so that the gear 98 is in substantial alignment with the drive gears 92 and 94. Each of the gears 92,94 and 98 is preferably of the type characterized as a timing pulley with outer flanges defining a groove so that the teeth of a timing belt 102 driven by gear 98 engage the teeth within the groove of the respective timing pulleys 92 and 94. The shafts 78 and 84 rotate in unison and at the same rate to move blanks in a chain of blanks, as explained in greater detail below, to the work station 64. The shafts 78 and 84 are spaced so that a continuous pitch is presented by the drive gears 76 and 82 and 74 and 80 respectively across the gap between two interconnected blanks in a chain of blanks moving along the path 62 and shown in phantom in FIG. 2A.

A sensor 104 cooperates with an energy emitting source such as an LED 103 mounted in the lid 20 and aligned opposite the sensor 104 when the lid 20 is in its closed position such that a blank moving along the path 62 passes between the sensor 104 and the LED 103. The sensor 104 and LED 103 are located a predetermined distance from the fixturing mechanism 66 at the work station 64 to permit accurate indexing of a blank to the work station as a blank is advanced along the path. Since the dimensions of a blank and the spacing between immediately adjacently connected blanks is known, and the pitch of the teeth comprising the rack gears of the blanks is known and continuous across the hinge gap between adjacently connected blanks, the distance of any one blank advanced along the path 62 is controlled by the operation of the drive mechanism 58 and the step motor 96 which in turn receives control signals from the controller 38 to activate and deactivate the motor. When the energy beam between the LED 103 and the sensor 104 is broken by the presence of an edge of a blank advancing along the path 62, the beam interruption is detected by the controller 38 and a counter is set in the controller to cause the step motor 96 to rotate the drive gears 92,94 which in turn rotate gears 74,76 and 80,82 respectively to advance a blank a predetermined distance along the path. By controlling the number of counts that the step motor 96 is activated, the distance traversed by a blank and its positioning along the path 62 is also controlled. The step motor control may be implemented in the instruction set or may be a hardware counter or a combination of the two.

In addition to detecting the presence of a blank edge by sensing an energy beam interruption, the presence of an energy beam between the LED 103 and the sensor 104 passing through an opening 65 in the body of the blank is detected by the controller 38 to determine the nasal side orientation of a blank at the work station 64. The nasal side orientation is required so that data characterizing the size and shape of a pattern to be cut from the blank at the work station is transformed wherein the nasal side data is correlated with the nasal side of a pattern cut from the blank and the nasal side indication on the pattern surface allows identification of a pattern corresponding to a right lens opening in an eyeglass frame. Since the number of blanks between the work station 64 and the sensor 104 are known, the presence of an energy beam passing through the opening 65 in the body of a blank at a predetermined time after the edge of the blank is detected at the sensor is correlated by the controller 38 to determine the orientation of a blank at the work station. Since the blanks are fed in an alternating nasal side arrangement, the instruction set in the controller 38 expects to detect the presence of the energy beam for every other blank passing the sensor.

Once a blank is advanced to the work station 64 and is in alignment with the fixturing mechanism 66, a blank separating mechanism indicated generally 106 is used to separate a blank at the fixturing mechanism 66 from an immediately adjacent connected blank by separating the blanks at the hinged connection point between blanks. The hinged connections are preferably designed to separate when an applied force of approximately 0.1 foot pounds is applied to one blank relative to a connected blank. The blank separating mechanism 106 comprises a separating plate 108 pivotally connected at one end 110 to a hinge 112 and the hinge base 113 is attached to the surface 114 of the frame 116 at the side of the work station 64 nearest the discharge side 50 of the generator. The hinge 112 pivots about a hinge axis 118. The opposite end 120 of the plate 108 is connected to a pull-down bar 122 which in turn is connected to a step motor 124 via a screw shaft 126. One end of the screw shaft 126 is attached to an end 128 of the pull-down bar 122 and through a nut 130 held internally in the step motor 124. The nut 130 is rotated by the step motor 124 to move the one end 120 of the plate 108 toward and away from the step motor 124 in a direction indicated by arrow 132.

The separating plate 108 further includes a centering counter sink 140 which is fixedly attached to the lower surface 142 of the plate 108 and in alignment with a center mounting pin 254 of a stripper rod 255 associated with a fixturing spindle body 234 comprising the fixturing mechanism 66. When the step motor 124 is activated in a direction to separate adjacent blanks, the counter sink 140 of the plate 108 engages with a center chucking hole in a blank at the work station 64 and pushes the blank onto the center mounting pin 254 causing the stripper rod 255 to be forced into the spindle body 234. Other chucking holes in the blank are aligned with locating pins 250,252 and engage the pins as the blank is separated from the chain of blanks and is pushed from an input feed level to a lower working level so that a blank fixtured on the spindle can be rotated without interfering with other blanks in the chain at the input feed level. The construction of the fixturing mechanism 66 is explained in further detail below in connection with the discussion of FIG. 5.

After a pattern is cut from a blank at the work station 64, the step motor 124 is activated to raise the plate 108 to release a pattern cut from a blank and held on the spindle. The next blank advancing to the work station 64 contacts the pattern resting on the fixturing mechanism and pushes the pattern into the discharge area generally designated 144.

The step motor 124 is mounted to a motor holder 134 which is pivotally connected at one end 136 to the surface 138 of the frame 116 to permit the step motor to rotate and maintain an alignment with the screw shaft 126 and the pull-down bar 122 as the distance between the step motor and the one end 120 of the plate 108 increases and decreases as the end 120 is moved in a direction indicated by arrow 132.

The cutting mechanism 68 includes a router 146 mounted in a shelf 148 of a carriage frame 70. The router 146 comprises a router body 147, a router spindle 149 extending lengthwise through the body 147 such that an axis 152 extending lengthwise through the center of the router spindle is substantially perpendicular to the plane of the path 62 in which the blanks travel. The router spindle 149 is arranged with a bit chuck 151 at one end nearest the work station 64 and a driving pulley 162 at its opposite end. A motor 154 has a motor shaft 156 and a pulley 158 attached thereto for rotation with the shaft and is coupled to the router 146 to provide rotational driving power to the router. The motor 154 is mounted to a bracket 160 formed on the carriage frame 70 such that the pulley 158 coupled to the motor shaft 156 is in substantial alignment with the driving pulley 162 of the router 146. The driving pulley 162 of the router 146 is rotated by a belt 164 coupling the motor drive pulley 158 to the router driving pully 162. The router driving pulley 162 rotates a router bit 166 held by the bit chuck 151 connected to the router spindle 149.

The carriage frame 70 is arranged with linear bearings 168, 170 and 172 mounted to the underside of the carriage. The bearings 168 and 170 are aligned to travel on a guide rod 174 passing axially through the bearings 168 and 170. One end 176 of the guide rod 174 is journalled in a collar clamp 178 mounted to the surface 114 of the frame 116 and the opposite end 180 of the rod 174 is journalled in a collar mounting bracket 182 mounted to the surface 184 of the frame 116. The bearing 172 is mounted midway between the bearings 168 and 170 and at the opposite side of the carriage 70. The bearing 172 rides on a guide rod 186 passing axially through the bearing and having one end 188 journalled in a mounting collar 190 mounted to the surface 184 of the frame 116 and its opposite end 192 journalled in a mounting collar 194 mounted to the surface 184 of the frame 116. The guide rods 174 and 186 are mounted in a parallel and spaced relationship to one another to permit movement of the carriage 70 toward and away from the work station 64 in the direction of arrow 72.

The carriage 70 is driven by a step motor 196 having an output shaft 198 journalled in bearings 200 which bearings are mounted to a bracket 202 mounted substantially perpendicular to the surface 184 of the frame 116 and in which bearings the shaft 198 rotates. A threaded shaft 204 is coupled to the motor shaft 198 and rotates in a ball nut 206 coupled to a nut retaining member 208 extending substantially perpendicularly downward from the underside of the carriage 70 and toward the surface 184 of the frame 116. The step motor 196 is a bidirectional motor and is activated and deactivated in one direction or the other direction in accordance with control signals from the controller 38 to move the carriage 70 in one direction and the opposite direction toward and away from the work station 64. The carriage 70 moves relative to a predetermined home position and for a predetermined desired distance in accordance with the control signals. The home position in the illustrative example coincides with the carriage 70 being retracted rearward to its furthermost rearward point away from the fixturing mechanism 66. The home position of the carriage 70 is generally fixed at the time of manufacture however, the initial calibration may change or a user may desire a home position other than the initially calibrated position in order to provide a different sized pattern to compensate for error caused for instance by worn parts in an associated apparatus adapted to use a pattern for example, to edge grind a lens. Consequently, an adjustment mechanism designated generally 212 is provided to permit limited adjustment of the movement of the carriage 70 in the direction toward the work station 64 and relative to the home position.

The adjustment mechanism 212 comprises a tool micrometer 214 fixedly connected to a U-shaped bracket 216 and which bracket is connected to the underside of the carriage 70. A spring loaded plunger assembly 218 is mounted on the bracket 216 opposite the micrometer 214 with the tip of the plunger assembly 218 in alignment with and in proximity to the measuring face of the spindle of the micrometer. A wand 220 is mounted to the frame 116 and arranged for pivotal movement about a pivot axis 222. The wand 220 comprises an elongated portion 224 having one end 226 positioned between the micrometer 214 measuring face and the plunger assembly 218 and to one side of the pivot axis 222. The opposite end 228 of the wand 220 includes a vane 230 extending substantially perpendicularly to the end 228 of the wand 220 for movement into and out of an optical sensor 232 mounted to the frame 116. The micrometer 214 and consequently the end 226 of the wand 220 moves with the carriage 70 causing the vane 230 to move into the sensor 232 when the carriage 70 moves away from the work station 64 and out of the sensor 232 when the carriage 70 moves toward the work station 64. In the illustrated embodiment, the carriage 70 and the router bit 166 is arranged to have a travel distance of 1.5 inches from a point 0.25 inches away from the axis 210. Accordingly, the adjustment mechanism 212 is adjusted to cause the vane 230 to be sensed by the sensor 232 when the router tip 166 is 1.75 inches from the center axis 210. Therefore, a circular pattern cut from a blank may have a radius ranging from 0.25 inches to 1.75 inches in the preferred embodiment.

The fixturing mechanism 66 comprises a cylindrical spindle body 234 having a lower end journalled in a bearing 236 and an upper end journalled in a bearing 238 and the body is arranged for rotation about the axis 210. The spindle body 234 is coupled at its lower end to a drive pulley 240 and is held by a retaining bracket and screw assembly 242 threaded axially into the spindle body. The spindle body is rotated by a step motor 244 having a motor shaft and drive pulley 246 coupled to the spindle body drive pulley 240 by a driving belt 248. The step motor 244 is coupled to the controller 38 and is activated and deactivated in accordance with signals from the controller to rotate the spindle body 234 and accordingly a blank fixtured to the spindle body. The step motor 244 rotates the spindle body 234 about its axis 210 with a resolution of 8,000 steps per 360 degrees that is, one revolution of the spindle.

Figure 5:
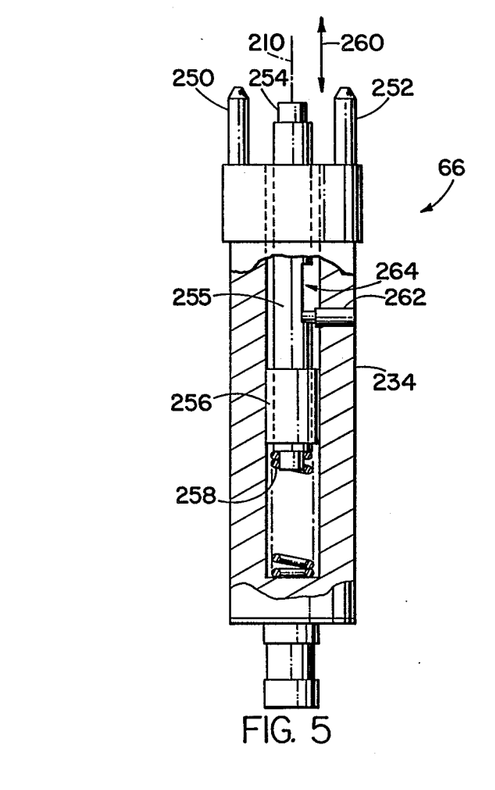
FIG. 5 is a slightly exploded view of the spindle used for fixturing a blank at the work station in the pattern generator.

Referring to FIG. 5, a slightly exploded, partially cut away view of the spindle body 234 is illustrated showing pins 250, 252 extending upwardly from the spindle and which pins are used for locating and transferring rotational driving force to rotate a blank fixtured on the spindle 234. A stripper rod 255 is arranged for coaxial movement within the spindle body 234 and passes through a bushing 256 also arranged coaxially within the spindle body. A spring 258 is located within the spindle body 234 and coaxially with the stripper rod 255 to urge the stripper rod upward in the direction of arrow 260. A retaining pin 262 extends transversely through one wall of the spindle body 234 into a notch designated generally 264 along a portion of the stripper rod 255 to limit the axial movement of the rod in the direction of arrow 260. When a blank is fixtured, the stripper rod 255 is pushed downward into the spindle body 234 by the action of the separating plate 108 pushing down on a blank and onto the center mounting pin 254 to compress the spring 258. Once the cutting operation is completed and the plate 108 is raised, the spring 258 urges the stripper rod 255 and the pattern upward to push the pattern out of engagement with the locating pins 250, 252 in readiness for discharge from the generator.

A waste collecting and discharging ring 266 is mounted concentrically with the spindle body 234 and rotates as the body rotates about the axis 210. Cut scrap parts from a blank are moved to the scrap discharge area via the discharge ring 266. The scrap on the ring 266 comes into contact with a sweeper element 268 which serves to sweep and guide the scrap off the ring and into the discharge area 144 as the ring and spindle body rotate.

The pattern generator of the present invention cuts a pattern in accordance with coordinate information characterizing the size and shape of a lens opening in an eyeglass frame, a lens or a pattern. The coordinate information may be provided from a number of different sources such as for example, a data base library stored in a memory contained within the pattern generator or a memory associated with a centralized data base computer and accessable by the pattern generator. The coordinate information characterizing the size and shape of a lens opening may also be provided from a frame tracing apparatus such as for example, the apparatus described in a copending application filed concurrently herewith and assigned to the same assignee as the present invention and entitled APPARATUS FOR TRACING THE LENS OPENING IN AN EYEGLASS FRAME. Coordinate information from the above-identified frame tracing apparatus is in the form of a number of radii lengths and associated angles for a predetermined number of positions defining the periphery of the associated lens opening and specifically provides 400 points along the periphery.

The coordinate information provided to the pattern generator from the above-referenced frame tracing apparatus is based on the standard boxing system of measurement. In the boxing system of measurement, the center point of rotation of a lens being peripherally edged or contoured in apparatus designed for that purpose corresponds to a centering hole in the middle of a pattern used with the edging apparatus to generate the shape and assumes that no decentration is required. The center point is referred to as the geometric or boxing center and is defined as being the center of the smallest rectangle which encloses the lens shape using horizontal and vertical lines when the pattern is positioned exactly in the same orientation as the frame lens opening when the frame is held horizontally.

The pattern size for the boxing system of measurement is the distance between the two vertical sides of the box and is referred to as the A dimension. The vertical dimension of the pattern is measured between the top and bottom of the box and corresponds to the B dimension of the frame. In addition to the A and B dimensions and the radii lengths and their respective angles, the frame tracer apparatus provides the effective diameter (ED) required for a given frame shape and size and corresponds to the minimum size of a lens blank required with the geometric center of the uncut lens blank at the boxing center of the frame lens opening. Reference may be had to the above-identified copending patent application or a standard text for additional information relative to the boxing system of measurement.

The instruction set in the controller 38 transforms the 400 points characterizing the size and shape of a lens opening as provided by the above referenced frame tracing apparatus into 8,000 points along the periphery defining the edge of the pattern. A linear interpolation algorithm in the instruction set is used to account for the resolution differences between the 400 points provided by the frame tracing apparatus and the 8,000 points generated by the pattern generator. The instruction set also takes into account the diameter of a router bit used in cutting the pattern in determining each point along the periphery of the pattern.

The instruction set in the controller 38 controls the rotation of the spindle fixturing mechanism 66 and the relative movement of the cutting mechanism 68 in the direction 72 to produce a relative motion between the cutter and the spindle and accordingly a blank fixtured on the spindle to achieve a pattern having a smoothly cut edge. The cutting algorithm contained in the instruction set is similar to that used in computer controlled milling machines to produce parts having smoothly cut edges.

Figure 8:
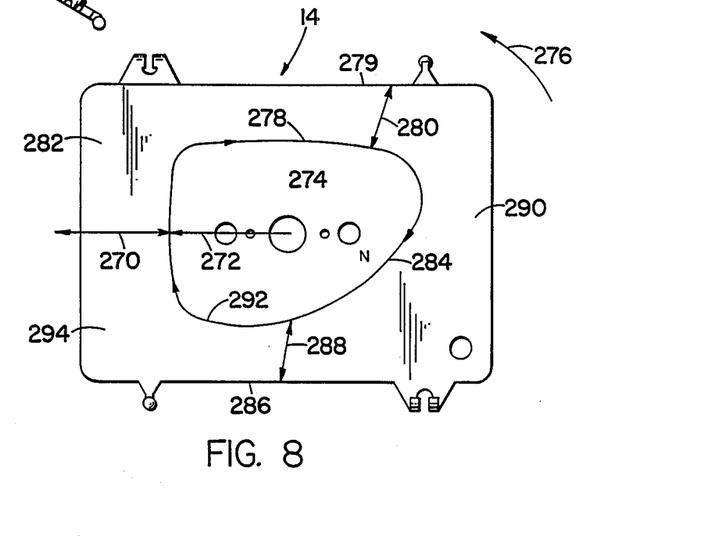
FIG. 8 is an exploded view of a blank showing the general path the cutter of the pattern generator of FIG. 1 follows in cutting as a fixtured blank rotates relative to the rectilinear movement of the cutter.

Considering now FIG. 8, the cutting mechanism 68 moves radially to cut a blank 14 along a path in a direction indicated by arrow 270 to provide a desired length radius 272 associated with a pattern 274 to be cut from the blank 14. The blank 14 is rotated by the fixturing mechanism in a direction indicated by arrow 276 and relative to the cutting mechanism to provide a cut along a portion of the path 278 corresponding to the periphery of the pattern. At a predetermined spindle rotation position the cutting mechanism moves along a path 280 to make a cut outwardly to the edge 279 of the blank 14 and produces a scrap piece 282 that separates from the blank body and falls into the discharge area at the work station of the generator. The cutting mechanism 68 returns along the path 280 to the point it left the path 278 and continues cutting the blank 14 along a path 284 corresponding again to the periphery of the pattern 274. At a second predetermined spindle rotation position, the rotation of the blank is stopped and the cutting mechanism moves along the path 288 to the edge 286 of the blank 14 to form a second scrap piece 290 which separates from the blank and falls into the scrap discharge area. The cutting mechanism 68 returns along the path 288 to the point it left the path 284 and continues cutting the blank 14 along a path 292 corresponding to the periphery of the pattern 274. Upon reaching a third predetermined point corresponding to the point at which the cutting mechanism 68 first entered the blank 14, the cutting mechanism is retracted along the path 270 to its starting position in readiness for the next cutting cycle. A third scrap piece 294 is separated from the pattern 274 and falls to the scrap discharge area. The pattern 274 is released from the fixturing mechanism 66 as described above and is discharged to the pattern discharge area when another blank 14 is moved into position at the work station 64. It will be understood that the controller 38 controlling the cutting mechanism may be programmed with an instruction set to cut a pattern from a blank and produce any desired number of pieces of scrap from the cut blank. Applicant has found that three pieces having the sizes generally depicted in FIG. 8 are easily handled by the scrap discharge ring in the pattern generator of the present invention and can be cut with a minimal amount of additional cutting time.

Considering now the operational features of the pattern generator embodying the present invention, the features are selectable via the keypad 34 illustrated in FIG. 1. The operation of a SET key 296 located on the keypad 34 controls the generator 10 to make a true size pattern, that is, a pattern corresponding 1:1 with the size of a lens opening in an eyeglass frame or to make a pattern 10,15 or 20 millimeters larger than the industry standard pattern size which is 36.5 millimeters. The desired pattern set number (10,15,20) is entered via the numeric keypad 300 after operating the SET key. The generator 10 defaults to a true size pattern after each cutting operation. The concept and use of pattern set numbers are well known to those skilled in the art.

1 to 1,000 identical pattern pieces may be made by operating a COPY key 298 located on the keypad 34 and inputting via the numeric keyboard the number of copies desired. If more than one pattern is being made, the display 36 displays the number of patterns made out of the number of patterns selected.

A SET UP key 302 is provided to select one of three internal patterns which are generally used to exercise the pattern generator and verify the dimensional movements of each of the moving subassemblies. The internal patterns comprise a circle, a peanut shape and a square. After a selection of one of the patterns is displayed on the display 36, the START key 304 is operated to start the pattern generator.

A MODE key 306 is used to select the source of input data to the pattern generator and when operated provides a local mode for receiving data from a frame tracing apparatus or a remote mode for receiving data from a computer data base or other memory device or remote data source.

A JOB NUMBER key 308 permits the entry of a six digit job number which identifies a particular job. The job number feature is generally only used in the remote mode of operation.

The operation of a STOP key 310 causes the pattern generator to stop after a current pattern being cut is cut or to exit from the waiting for data condition of the pattern generator.

A pattern is cut after a START key 304 is operated which in the local mode causes the generator to wait for data from a frame tracing apparatus and in the remote mode requests the job information from a computer data base.

A method and associated apparatus for making patterns from blanks in accordance with coordinate information characterizing the size and shape of a lens opening in an eyeglass frame, a lens or a pattern has been described in a preferred embodiment. It will be noted that numerous changes and modifications may be had without departing from the spirit and scope of the invention and therefore the invention has been described by way of illustration rather than limitation.

We claim:

1. Apparatus for generating a pattern for a lens opening in an eyeglass frame, said apparatus comprising:
   means for containing an instruction set to control the operation of said apparatus;
   means for providing a plurality of data points collectively representative of the size and shape of an associated lens opening in an eyeglass frame;
   means for feeding a blank from a supply of blanks to a work station associated with said pattern generating apparatus;
   means for fixturing the blank at the work station;
   means for rotating the blank fixtured at the work station;
   cutter means located in the region of the work station for cutting the blank fixtured at the work station, and
   means for moving said cutter toward and away from the fixtured blank in accordance with the instruction set as the fixtured blank rotates relative to said cutter movement to make a pattern having the size and shape of the associated lens opening corresponding to said plurality of data points.

2. Apparatus for generating a pattern as defined in claim 1 wherein said apparatus further includes a feeding and staging area for receiving the blanks, said feeding means further including means for advancing a blank presented at an input to said feeding and staging area along a path to the work station.

3. Apparatus for generating a pattern as defined in claim 2 further comprising said fixturing means being rotatable about an axis substantially perpendicular to the direction of a plane defining said path along which a blank is advanced to the work station, and
   carriage means slideably mounted on a base and having means for movement along a rectilinear path toward and away from said fixturing means, said cutter being coupled to said carriage for movement with said carriage in response to control signals from the instruction set.

4. Apparatus for generating a pattern as defined in claim 1 wherein said cutter means includes a router.

5. Apparatus for generating a pattern as defined in claim 3 wherein said fixturing means includes an axially elongated spindle body having an upper end arranged for engagement with a blank and a lower opposite end having drive means for rotating said spindle and a first step motor drivingly coupled to said spindle drive means to rotate said spindle, said upper end being axially moveable and having a first position in the region of said path for receiving a blank for fixturing and for discharging a pattern cut from a blank and a second position below the level of said path for rotating a fixtured blank without interfering with a blank located along said path.

6. Apparatus for generating a pattern as defined in claim 3 wherein said carriage movement means includes a second step motor.

7. Apparatus for generating a pattern as defined in claim 6 wherein said carriage has a home position for locating said carriage and said cutter at a predetermined position with respect to said fixturing means.

8. Apparatus for generating a pattern as defined in claim 7 further including means for locating said carriage means at its home position along said rectilinear path, said home locating means including an interrupter and a sensor, said interrupter being pivotally coupled to said base, one end of said interrupter being coupled to means located on said carriage for movement with said carriage and the other end of said interrupter being arranged to activate said sensor when said carriage moves a distance away from said fixturing means, said carriage having means for adjusting the position at which said interrupter activates said sensor whereby said adjusted position coincides with said home position to locate said carriage at said predetermined position with respect to said home position when said carriage is moved in a direction toward said fixturing means.

9. Apparatus for generating a pattern as defined in claim 2 wherein said advancing means includes:
   drive means disposed on opposite sides of said path and arranged for complementary engagement with drive elements associated with the blank to advance the blank along said path;
   sensing means for sensing the position of a blank along said path, and
   means responsive to said sensing means for indexing said blank a predetermined distance along said path, said sensing means further sensing in accordance with said instruction set the orientation of a blank advanced to said work station, said blank having a first and second orientation at said work station wherein said blank has a nasal side indicia located at one side of said work station when in said first orientation and said blank has said nasal side indicia located at a side opposite said one side of said work station when in said second orientation.

10. Apparatus for generating a pattern as defined in claim 9 wherein a blank indexed along said path is in a chain of blanks interconnected end-to-end and each blank in the chain having an opening through its body indicating the nasal side of the blank, said opening being substantially located in one corner of the blank, each blank in the chain being connected together in an alternating fashion such that an advance blank immediately adjacent one blank has its opening along a side opposite the side of said one blank, said advance blank and a trailing blank immediately adjacent said one blank having their respective openings along the same side of said path and said one blank having its opening on the opposite side of said path.

11. Apparatus for generating a pattern as defined in claim 10 wherein said sensor is located along one side of said path and is arranged for alignment with said opening in a blank being indexed along said path, said sensor further being located a predetermined distance from said work station.

12. Apparatus for generating a pattern as defined in claim 11 wherein said sensor comprises a light emitting source being located above an upper face of a blank advancing along said path and a light detector being located below a lower face of said blank and in substantial alignment with said light emitting source so that light emitted from said light source is sensed by said light detector when said light source and said detector and said opening are in substantial registry with one another.

13. Apparatus for generating a pattern as defined in claim 1 wherein each of said data points is a radius and an associated angle whereby a number of such radii and associated respective angles characterize the size and shape of said lens opening in said eyeglass frame.

14. Apparatus for generating a pattern as defined in claim 1 wherein the size of a pattern cut from the blank is selectable from a group of predetermined pattern set numbers.

15. Apparatus for generating a pattern as defined in claim 1 wherein the size of a pattern cut from the blank corresponds 1:1 with the size of said lens opening in said eyeglass frame.

16. A method for generating from a blank a pattern for a lens opening in an eyeglass frame, said method comprising the steps of:
   programming a pattern generating apparatus with an instruction set to control the apparatus;
   providing a plurality of data points collectively representative of the size and shape of an associated lens opening in an eyeglass frame;
   feeding a blank from a supply of blanks to a work station associated with the pattern generating apparatus;
   fixturing the blank at the work station;
   rotating the blank fixtured at the work station, and
   moving a cutter toward and away from the blank in accordance with the instruction set as the blank rotates relative to the cutter movement to make a pattern having the size and shape of the associated lens opening corresponding to said plurality of data points.

* * * * *

UNITED STATES PATENT AND TRADEMARK OFFICE
CERTIFICATE OF CORRECTION

PATENT NO. : 4,711,035
DATED : December 8, 1987
INVENTOR(S) : Logan, et al.

It is certified that error appears in the above-identified patent and that said Letters Patent are hereby corrected as shown below:

Face of Patent: Filed: Please delete "December 8, 1987" and substitute --August 14, 1986--.

Column 1, line 41; delete "inconsistences" and substitute --inconsistencies--.

In the drawings, Sheet 2, Fig. 2A, the reference numeral 96 should be applied to the step motor coupled to the output shaft 100.

In the drawings, Sheet 4, Fig. 3, the reference numeral 96 should be applied to the step motor adjacent to step motor 244.

In the drawings, Sheet 6, Fig. 8 the reference numeral 274 should be underlined.

Signed and Sealed this

Thirty-first Day of May, 1988

Attest:

DONALD J. QUIGG

*Attesting Officer*

*Commissioner of Patents and Trademarks*